UNITED STATES PATENT OFFICE 2,282,686

ANTIOXIDANT

Paul R. Van Ess, Berkeley, Calif., assignor to Shell Development Company, San Francisco, Calif., a corporation of Delaware No Drawing. Application August 26, 1940, Serial No. 354,251

6 Claims. (Cl. 252—46)

This invention deals with the use of certain thioxins as addition agents to hydrocarbon oils and other organic substances normally susceptible to deterioration by oxidation. I have discovered that the presence of these compounds in suitable amounts in such substances causes the latter to become relatively resistant to oxidation. Moreover, if the substances are corrosive, my compounds will reduce or inhibit their corrosiveness.

Corrosiveness of organic substances may be inherent in their chemical structure or composition or may be induced by oxidation. Either type of corrosiveness may be reduced, and in many instances be completely inhibited.

It is known that the resistance to oxidation of organic substances can be improved by the addition of anti-oxidants of which there are two types, namely, oxidation inhibitors and oxidation retarders. Inhibitors are believed to protect the substance by breaking the chain reaction which is normally involved in the slow oxidation of organic substances. In so acting, the inhibitors become oxidized themselves and are rendered ineffective for further inhibition. Retardants, on the other hand, are compounds which, when oxidized, produce oxidation inhibitors. A retarder thus has a delayed inhibiting effect, and in order to afford oxidation protection, must oxidize more readily than the substance which it protects. Moreover, it must be present in concentrations sufficient so that there is produced at all times an effective amount of inhibitor. Inhibitors are usually effective in minute concentrations, e. g., from about .001% to .1%, higher concentrations merely prolonging the time of exhaustion of the available supply. Retarders, on the other hand, must usually be present in much larger amounts, e. g., normally from about 1% to 10%.

I have found that my compounds are capable of acting both as oxidation inhibitors and as retarders. This is of considerable advantage because, due to this dual effect, the compounds not only give immediate inhibiting protection, but also will prolong this protection over a very extended period of time.

The thioxins which I have found to possess the described desirable properties are:

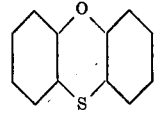

Dibenzothioxin (phenoxthin)

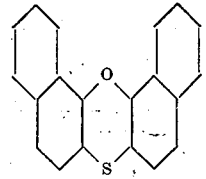

Alpha-alpha'-dibenzophenothioxin

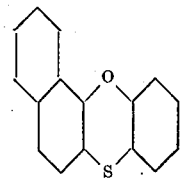

Alpha-benzophenothioxin

Substituted homologues of the above having attached to one or several aromatic nuclei, one or several ortho- and para-directing substitution radicals, such as hydrocarbon radicals, e. g., alkyl, naphthenyl, aralkyl; or polar radicals, e. g., hydroxyl, hydrosulfide, ether, primary or secondary amino, nitroso, halogen, etc., radicals. It is desirable that hydrocarbon radicals be attached to the nucleus in positions other than ortho position to the sulfur compound, while polar radicals may advantageously be in this very position.

It is of interest to note that while gamma-gamma'-dibenzophenothioxin has no inhibiting properties but in fact has been found to aggravate corrosiveness of substances to which it was added, the reaction product of di-alpha-naphthylether and sulfur in the presence of aluminum chlorida, and which is presumably by analogy alpha-alpha'-dibenzophenothioxin, has an inhibiting effect.

Thioxins of this invention can be produced by reacting, for example, diphenyl oxide, di-alpha-naphthyl ether, alkylated diphenyl oxides or alpha-naphthyl ethers, etc., with free sulfur in the presence of aluminum chloride at temperatures of about 80°–100° C. If desired, substitution radicals may be introduced into the thioxins by well-known reactions. For example, they may be alkylated by reacting them with olefines, alcohols or ethers in the presence of sulfuric acid, phosphoric acid, or other alkylation catalysts.

The thioxins of this invention are thermally quite stable, and therefore are useful as addition agents to a large number of substances which are in need of improvement with regard to resistance to oxidation or reduction of corrosiveness or both. Thus they may be added to gasolines, kerosenes, Diesel fuels, lubricants, electric oils, or to non-hydrocarbon substances such as fats, fatty acids, soaps, naphthenate driers, essential oils, extracts of pyrethrum and other insecticides which lose their potency on exposure to air, etc. As is well known, resistance to oxidation and reduction of corrosion is of particular value in industrial hydrocarbon oils, i. e., hydrocarbon oils which are used in the running and maintenance of various types of machines. The term industrial oil, therefore, covers motor fuels, such as gasoline, tractor fuel, Diesel fuel, etc., lubricants and electrical oils.

Of particular interest is the use of my thioxins in lubricating oils containing corrosion-inducing amounts, e. g., from about .1%–5% of oil-soluble detergents, such as salts of polyvalent metals, more particularly of Mg, Ca, Sr, Ba, Zn, Cd, Al, Sn, Pd, Cr, Mn, Fe, Ni, Co, Cu, with organic acids, such as fatty acids, fatty acids having attached aromatic radicals as phenyl, hydroxy phenyl, benzyl, benzal, etc., radicals; naphthenic acids, acids obtained from natural waves as Montan wax, carnauba wax, candelila wax, etc., acids obtained by oxidation of paraffin wax, acids obtained by hydrolysis of rosin oil or talloil; alkylated benzoic, hydroxy benzoic, naphthoic, etc., acids; sulfonic acids, such as so-called mahogany acids, etc. It is known that these soaps cause lubricating oils to become more or less corrosive, particularly to alloy bearings, such as copper-lead, cadmium-silver, cadmium-nickel, etc. The thioxins herein described are particularly active in restraining this type of corrosion.

The amount of the thioxins to be added varies somewhat, depending upon the purpose to be achieved and on the substance to be protected. For instance, to improve storage stability of various substances, relatively small amounts, e. g., from about .001% to 1%, are normally sufficient. Thus gasolines and other motor fuels seldom require amounts greater than about .1%. On the other hand, substances which are exposed to oxidizing influences at elevated temperatures may require larger amounts, e. g., up to about 5% or 10%. Again, where it is necessary to inhibit corrosion it may be desirable to use amounts in excess of .2%, although much smaller amounts may be sufficient to inhibit cases of slight corrosiveness.

The following example further illustrates my invention:

Samples of lubricating oils were subjected to a thrust-bearing corrosion test to determine their corrosiveness. In this test a hardened steel disc is made to rotate for 20 hours under constant pressure against three flat alloy bearings. The bearing assembly rests in a heavy steel cup filled with the oil to be tested. During the test, the temperature of the oil is maintained at 107° C. The bearings are weighed before and after the test, the difference in weight representing the loss sustained during the test.

The bearings employed in the table reported below consisted of copper-lead alloy. The oils tested were of the type of anti-ringsticking Diesel lubricating oils consisting of a mineral lubricating oil S. A. E. 30, of 55 V. I. and containing a detergent soap, which soap caused the oil to be quite corrosive. For comparison, the corrosiveness of the straight mineral oil is also shown:

| Oil | Bearing loss mg./sq. cm. |
|---|---|
| Straight mineral oil | .20 |
| Oil+2.5% calcium petroleum sulfonate | 5.7 |
| Oil+2.5% calcium petroleum sulfonate+1% phenoxthin | .04 |
| Oil+2.5% calcium petroleum sulfonate+1% 3-6 diisoprophl phenoxthin | .20 |
| Oil+2.5% calcium petroleum sulfonate+1% alpha-alpha'-dibenzophenoxthin | 0.21 |

As will be noted, the addition of the thioxthin reduced the corrosiveness of the Diesel lubricant containing the detergent soap to that of the straight mineral oil or lower.

I claim as my invention:

1. A lubricating oil containing dissolved a small amout of a thioxin selected from the class consisting of dibenzothioxin, alpha-alpha'-dibenzophenothioxin, alpha - benzophenothioxin and the substituted homologues thereof containing attached to aromatic nuclei ortho- and para-directing substitution radicals.

2. A lubricating oil containing a corrosive amount of an oil-soluble detergent salt and dissolved from .2% to 10% of a thioxin selected from the class consisting of dibenzothioxin, alpha-alpha'-dibenzophenothioxin, alpha-benzophenothioxin and the substituted homologues thereof containing attached to aromatic nuclei ortho- and para-directing substitution radicals.

3. An industrial oil comprising a hydrocarbon oil normally susceptible to deterioration by oxidation containing dissolved a small amount of 3-6 diisopropl dibenzothioxin.

4. An industrial oil comprising a hydrocarbon oil normally susceptible to deterioration by oxidation containing dissolved a small amount of 3-6 dialkyl dibenzothioxin.

5. An industrial oil comprising a hydrocarbon oil normally susceptible to deterioration by oxidation containing dissolved a small amount of alpha-benzophenothioxins and substituted homologues thereof.

6. An industrial oil comprising a hydrocarbon oil normally susceptible to deterioration by oxidation containing dissolved alpha-benzophenothioxin.

PAUL R. VAN ESS.